Figure 1:
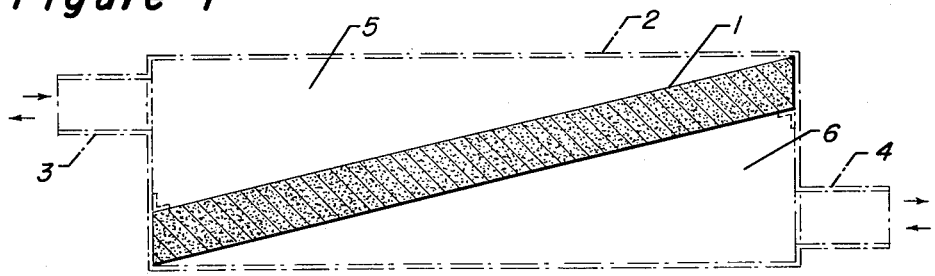

June 7, 1966  V. HAENSEL  3,255,123

FORMED CATALYST SHAPES AND METHOD OF PREPARATION

Filed June 18, 1963

INVENTOR:
Vladimir Haensel

BY: James R. Hoatson Jr.
Philip T. Liggett
ATTORNEYS

United States Patent Office 3,255,123
Patented June 7, 1966

3,255,123
FORMED CATALYST SHAPES AND METHOD OF PREPARATION
Vladimir Haensel, Hinsdale, Ill., assignor to Universal Oil Products Company, Des Plaines, Ill., a corporation of Delaware
Filed June 18, 1963, Ser. No. 288,675
5 Claims. (Cl. 252—477)

The present invention relates to formed catalyst shapes and to their method of preparation. More specifically the invention is directed to a method for bonding subdivided catalyst particles into particular shapes for use in catalytic conversion units to preclude subsequent settlement and breakage from fluidization or movement of particles as well as preclude bypassing of the reactant stream through a settled portion of the unit.

In certain catalytic treating installations there is considerable jarring as well as temperature expansions and contractions which can lead to the settlement of the catalyst and the channeling of a reactant stream with resultant high attrition rates in the converter. For example, in automobile exhaust gas converters using subdivided particles there is a problem of extreme jarring and settlement as well as the problem of expansion and contraction of the converter casing which can lead to the excessive channeling or bypassing of a major portion of the stream through the catalyst bed. Also, in a substantially flat bed catalyst unit where there is an upflow of the gas stream or in an annular-shaped catalyst retaining section, which is of particular advantage in providing uniform flow and good catalyst contacting characteristics, there is at least some fluidization of unbonded subdivided particles which will lead to high rates of attrition and catalyst loss.

It is thus a principal object of the present invention to provide a substantially rigid form of catalyst unit made into a predetermined shape from active subdivided catalyst particles.

It is also an object of the present invention to provide an improved method for bonding catalyst particles into predetermined shapes which are to be utilized in an auto muffler-converter chamber without the need of supporting screens or perforate plates to hold such shaped catalyst section in the converter. In other words, a shaped catalyst unit is provided which is sufficiently rigid to be self-supporting and preclude settlement or attrition from bouncing or jarring conditions which may be encountered in an automobile installation.

One embodiment of the present invention provides, a method for forming subdivided catalyst particles into a substantially rigid catalytic shape for use in a converter means which comprises the steps of placing and packing catalytically active subdivided particles into a desired form, dispersing at least one bonding material substantially uniformly into the voids provided by the packed catalyst particles and then effecting a heating of the entire mass of catalyst particles and the bonding material to provide a crosslinkage reaction therein and the formation of a resultant rigid form catalytic shape.

In connection with certain catalytic compositions, as for example, where silica, alumina or silica-alumina and the like are used as a carrier material for the active catalytic component, then there may be a satisfactory bonding of the catalyst mass by the use of a suitable bonding material such as phosphoric acid. Thus, the addition of a predetermined quantity of phosphoric acid into a tightly packed catalyst bed, together with a uniform dispersion of the material throughout the catalyst bed will, upon heating the mass, effect a fusing and bonding of particles at points of contact to result in a desired rigid shaped section.

A generally preferred method of preparation to insure adequate bonding of the catalyst particles will utilize the addition of smaller particles of a solid bonding material, which may comprise various of the polyvalent oxides such as an oxide of silica, boron, aluminum, titanium, zirconium and vanadium. Such oxides, being powdered or formed into finely divided particles, are substantially smaller than the catalyst particles and they may be vibrated or otherwise dispersed throughout the packed catalyst particles to at least partially fill the interstices or void spaces between catalyst particles. Subsequently, a solution of a polyvalent inorganic acid, such as phosphoric acid, sulfuric acid or boric acid, may be added to the catalyst particles and the dispersed bonding material so that upon heating there is a bonding or crosslinking reaction between the oxide bonding material and the inorganic acid to effect a fused catalyst mass. The term "polyvalent," as used herein with respect to the various inorganic materials, has the meaning that the material has a valence greater than one.

In a somewhat more specific embodiment, the present invention provides a method for forming subdivided catalyst particles into substantially rigid shapes for use in contacting a reactant stream within a converter means, which comprises the steps of placing and packing substantially uniform sized catalytically active particles into a forming chamber having a desired configuration, adding subdivided solid bonding material of a size substantially smaller than catalytic particles into said container and effecting the distribution of such finer particles into the voids between said catalyst particles by vibrating means, subsequently dispersing a bonding solution capable of reacting with said smaller sized bonding particles into said container, and effecting the heating of the entire mass of catalyst particles and dispersed bonding materials to provide a fusing of the latter and a formation of a resulting substantially rigid catalytic shape having the form of said container means.

There are various advantages that result from the use of a rigid shaped catalyst section in that there may be elimination of screens or perforate plates which are ordinarily required in a converter unit to hold loose subdivided catalyst particles. Also, as mentioned hereinbefore, there is an elimination of settling and bypassing through a thin portion of a catalyst bed when the catalyst is held as a rigid preformed mass in a converter unit, as well as the elimination of breakage and attrition from the excessive movement of catalyst particles. It is necessary that the addition of the bonding materials to the subdivided catalyst particles will not entirely close the interstices of the bed to cause an excessively high pressure drop therethrough. In other words, the finished shape catalyst mass must be somewhat porous and of the nature of a fritted material such that a gas stream to be treated can readily pass through the catalyst section without undue pressure drop. Inasmuch as there will be an elimination of screens or other types of perforate support plates for the catalyst section, there can be a greater amount of pressure drop exerted by the present catalyst section than exists in a loosely packed catalyst bed positioned on supporting plates. Generally, the subdivided catalyst particles will be of a uniform spherical size, as for example in the $\frac{1}{16}''$ to $\frac{1}{4}''$ diameter range, such that there may be a uniform flow of a gaseous reactant stream through the catalyst and through the uniformly distributed bonding materials within the voids provided by the catalyst particles. However, it is not intended to limit the formation of the predetermined catalyst shapes to the use of sperical catalyst particles since uniformly shaped pellets or other forms of active catalyst may well be utilized in the preparation of the bonded catalyst shapes.

Various means may be utilized for effecting the addition of the bonding material into a packed catalyst bed whereby to form a predetermined rigid shape. In one instance the catalyst particles are put into a container having a form which simulates the shape of the desired final configuration of the catalyst to be used in a particular converter case. The catalyst is then subjected to a settling procedure such as may be obtained by placing the container on a high speed vibrator. The packed catalyst may then be held in place by a screen or perforate plate means at the top filling end of the unit and where a solid bonding material is to be added, then such material may be introduced through the screen or perforate plate means holding the catalyst while effecting additional high speed vibration. The vibration carries the finer bonding material into the interstices or voids of subdivided catalyst particles in a uniform manner. The solid bonding materials will also be substantially smaller in size than the catalyst particles, and generally of the order of 10% to 15% of the diameter of the catalyst particles such that they will readily pass through a holding screen and through the upper void spaces of the packed bed to become substantially uniformly distributed throughout the entire mass. Subsequently a suitable acid solution which will form a bond or cross-linkage with the catalyst carrier or with the bonding material is added to the container and permitted to contact and wet the dispersed particles. Subsequently, the heating of the entire mass to an elevated bonding temperature will effect the reaction of the bonding solution with the catalyst particles and/or with the finely divided solid bonding material such that there is a resulting fused rigid catalyst shape upon the removal of the cooled unit from the forming container.

Referenece to the accompanying drawing and the following description and examples will serve to further amplify the improved method of forming predetermined rigid catalyst shapes for use in converter units.

FIGURE 1 of the drawing indicates diagrammatically a generally rectangular form of a catalyst shape suitable for placing transversely across a confined converter chamber.

Figure 2:
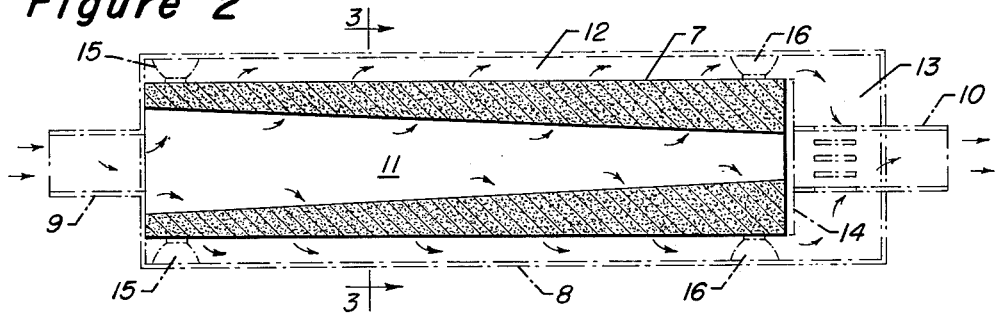

FIGURE 2 of the drawing indicates diagrammatically the use of a tubular form of catalyst shape which may be used in an oval form converter case.

Figure 3:
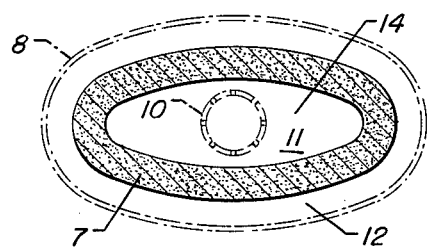

FIGURE 3 of the drawing indicates a cross-section view through the tubular form of rigid catalyst shape and the oval form container, such as shown by the line 3—3 in FIGURE 2.

Figure 4:
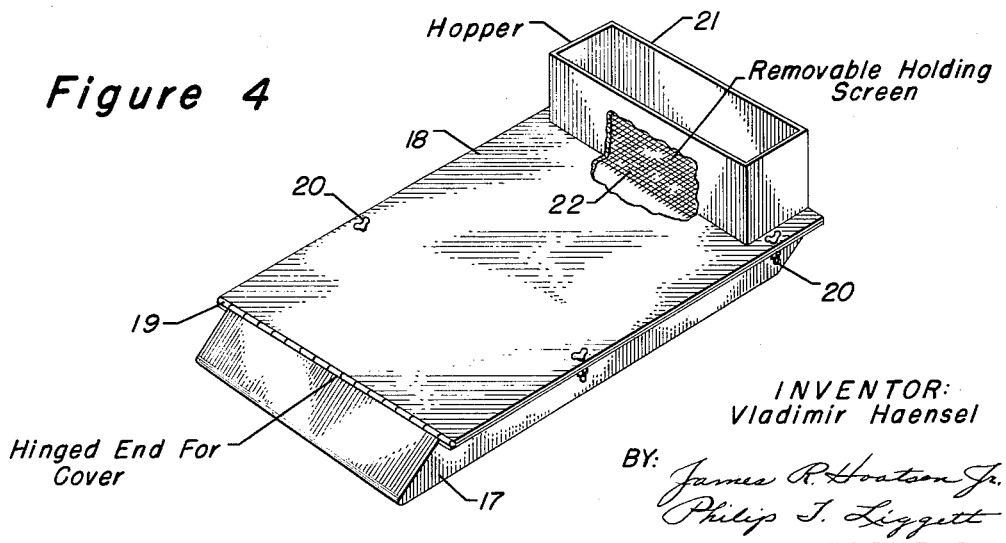

FIGURE 4 of the drawing indicates diagrammatically a forming chamber which may be used to mold a generally rectangular type of rigid catalyst shape.

Specifically, in FIGURE 1 of the drawing there is indicated a rectangular catalyst shape 1 which may be clamped or otherwise held in position within a rectangular form of casing 2. The converter casing 2 is provided with gas ports 3 and 4 suitable for accommodating, for example, an exhaust gas stream from an auto engine. Such gas stream may be introduced through port 3 into manifold section 5 for passage through the rigid catalyst section 1, thence into exhaust gas manifold 6 and outwardly by way of port 4. Conversely, the exhaust gas flow may enter port 4 and pass upwardly through catalyst unit 1 to be discharged through the port 3.

In another embodiment, as shown by FIGURE 2, a tapering tubular form rigid catalyst shape 7 is installed within an oval form converter casing 8 having an inlet port 9 and an outlet port 10. The tubular form of catalyst section 7 is positioned axially within the converter such that there may be on outward radial gas flow from an internal manifold zone 11 to an outer annular manifold zone 12 and thence in a longitudinal flow into an end zone 13 which in turn communicates with the outlet port 10. A suitable end plates member 14 blocks the downstream gas flow from passing longitudinally out of zone 11 such that all of the gas flow necessarily passes radially outwardly to the external manifold section 12. By the use of a suitable rigid catalyst unit 7, it is unnecessary to have supporting screens or perforate members therearound; however, suitable spacer support members 15 and 16, or other equivalent guides, are indicated as being spaced around the inside periphery of the converter casing 8 such that the catalyst unit is held in a proper central position.

As best shown in the sectional view of FIGURE 3, the catalyst unit 7, as well as the converter casing 8, is formed into a relatively flat oval design to conform in general with the shape or configuration of conventional auto mufflers which are positioned below the vehicle and require a maximum of road clearance. However, where space or clearance is not a problem, a circular cross section cylindrical form catalyst unit may be provided and it is emphasized that it is not intended to limit the rigid catalyst shape to any one predetermined form. It may also be noted that the rigid catalyst unit 7 has a varying wall thickness such that there is a greater thickness through the downstream end of the unit than through the upstream portion thereof, whereby there is compensation for the effect of the velocity head of the incoming exhaust gas stream. In other words, with a greater pressure drop required for the gas flow through the downstream end of the unit, there is a resulting increase in the radial flow through the upstream end of the unit, than there would be with conventional uniformly thick wall portions, and a resulting substantially uniform flow throughout the entire length of such unit.

*Example I*

In one example, setting forth the steps of forming a shaped catalyst unit, there may be effected the rigid bonding of previously formed ⅛" average diameter oxidation catalyst particles comprising low density refractory alumina spheres impregnated with at least one catalytically active metal component. Such alumina spheres may be prepared in accordance with the teachings of Hoekstra Patent No. 2,620,314 issued December 2, 1952, and it is deemed unnecessary to set forth the details of preparation herein. The impregnation providing a stable oxidation catalyst may be carried out with a metal from Group VIII of the Periodic Table; for example, with platinum. Such spheres being soaked in chloroplatinic acid to provide an amount of from about 0.15 to about 0.60 Troy ounces of platinum per cubic foot of the carrier after drying and calcining. The impregnated spheres are then dried at about 200° F. and subsequently calcined at high temperature of about 1000° F. in air or in a reducing gas.

The finished catalyst spheres are then put into a container simulating the shape of the desired final configuration for insertion in a catalyst converter or casing. Reference to FIGURE 4 of the drawing will show diagrammatically a container suitable for forming a catalyst unit of a generally flat rectangular shape suitable for insertion and use in a converter such as indicated in FIGURE 1 of the drawing. The lower container body 17 is provided with a movable cover 18, having a hinge member 19 at one end thereof, and provision for bolts 20, or other suitable clamping means, such that there may be ready access to the interior of the chamber and the removal of the ultimately formed rigid catalyst section. For convenience a hopper 21 is provided at one end of the cover or of the chamber and a removable holding screen 22, which may be clamped in place, is positioned at the juncture between the bottom of the hopper 21 and the top level of the chamber body 17.

In initiating the forming operation, catalyst particles are filled into the container body 17 through the hopper end 21 while the entire container is subjected to high speed vibration to effect a maximum packing of the catalyst particles into the entire rectangular form body portion 17. The catalyst is then locked or held in place by the holding screen 22 in the present instance, whereby the subsequent handling of the container, or the introduction of bonding material thereto, will not permit a loosening or disturbing of the catalyst particles. A finely divided bonding material such as silica, which is prepared to be of the order of 10% to 15% the size of the ⅛-inch catalyst particles, is then introduced into the hopper 21 and upon additional high speed vibration permitted to fall down and be uniformly dispersed into the voids between the catalyst spheres. Thus, where finely divided silica is utilized to fill the packed ⅛-inch spherical catalyst bed then such silica particles are of the order of a 50 to 60 mesh size. After the silica particles are dispersed throughout the catalyst mass then a solution of phosphoric acid, containing 50 to 70 percent phosphorus pentoxide is added to the container to effect the wetting of the catalyst spheres and the silica particles. The entire mass is then heated to effect the bonding of the phosphoric acid with the silica bonding material and the alumina spheres, which temperature may be of the order of 400° F. or higher. After cooling, the resulting substantially rigid bonded catalyst unit may be removed from the container 17 by the unclamping and lifting of the cover 18, the cooled catalyst shape being now ready for use in a suitable catalytic converter case.

*Example II*

As hereinbefore set forth, there are various bonding materials which may be utilized to effect the bonding of the catalyst particles into a substantially rigid fused unit. Thus, in another specific example, following the procedure of Example I, there may be added finely divided alumina particles into a bed of subdivided catalyst which has been compacted at a suitable high speed vibration and then high temperature bonding effected with the use of sulfuric acid in an amount and quantity reactable with the alumina to effect a good bond between adjacent particles. This will occur at temperatures in excess of about 400° F.

*Example III*

In another preparation, following the general procedure described for Example I, there may be the addition of an organic compound having multiple functional groups, such as hydroxyl or amino groups, which will aid in the initial bonding between the catalyst particles in the presence of polyvalent acids. Such acid will be present in an amount from 5% to 60% of the composite. Heating and bonding of the components will generally be in excess of about 400° F.

*Example IV*

In still another rigid shape preparation, following the general procedure for Example I, finely divided boric acid is added to catalyst particles, followed by the addition of phosphoric acid, to provide a boro-phosphate bond between the catalyst particles. Here again, the added acid compound will be in amount of from 5% to 60% of the composite.

In still another instance, in addition to the polyvalent inorganic acids such as boric acid, phosphoric acid and sulfuric acid, there may be used certain inorganic polymer type of materials such as aluminum hydroxide containing a chloride group, sulfate group or a phosphate group. Such materials will effect the bonding of the subdivided catalyst particles when brought in contact with reactive catalyst particles at their points of contact while in a forming container to effect a resulting rigid catalytic unit of desired shape.

I claim as my invention:

1. A method for producing rigid catalyst shapes which comprises packing catalytically active subdivided particles into a forming chamber having the configuration of said catalyst shapes, thereafter introducing to said chamber a subdivided solid bonding material of a particle size substantially smaller than said catalyst particles and uniformly distributing the same into the voids between the catalyst particles, subsequently introducing to said chamber a liquid bonding agent reactable with said solid bonding material and uniformly dispersing the same throughout the mass of solid particles, and then heating the entire mass sufficiently to fuse the bonding materials with the catalyst particles and form a rigid catalyst shape of the configuration of said chamber.

2. The method of claim 1 further characterized in that said catalyst particles are packed into the forming chamber and the smaller particles of solid bonding material are distributed into said voids by vibration of said chamber.

3. The method of claim 1 further characterized in that said liquid bonding agent is a polyvalent inorganic acid and said solid bonding material is a polyvalent inorganic oxide capable of crosslinking with said acid.

4. The method of claim 3 further characterized in that said polyvalent inorganic oxide is an oxide of an element selected from the group consisting of aluminum, silicon, boron, titanium, zirconium and vanadium.

5. The method of claim 3 further characterized in that said inorganic polyvalent acid is selected from the group consisting of phosphoric acid, sulfuric acid and boric acid.

References Cited by the Examiner

UNITED STATES PATENTS

| | | | |
|---|---|---|---|
| 2,106,910 | 2/1938 | Finn | 252—477 |
| 3,170,758 | 2/1965 | Honerkamp. | |
| 3,177,151 | 4/1965 | Calvert. | |

BENJAMIN HENKIN, *Primary Examiner.*

MAURICE A. BRINDISI, *Examiner.*

R. D. EDMONDS, H. S. MILLER, *Assistant Examiners.*